(12) United States Patent
Beutlberger et al.

(10) Patent No.: US 9,558,238 B2
(45) Date of Patent: Jan. 31, 2017

(54) DISTINCTION ENTITIES FOR SEGMENTATION

(71) Applicants: Merlin Beutlberger, Ketsch (DE); Hans-Martin Binder, Heidelberg (DE); Sebastian Schipplick, Bad Dürkheim (DE); Erwin Tenhumberg, Schwetzingen (DE)

(72) Inventors: Merlin Beutlberger, Ketsch (DE); Hans-Martin Binder, Heidelberg (DE); Sebastian Schipplick, Bad Dürkheim (DE); Erwin Tenhumberg, Schwetzingen (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 14/480,111

(22) Filed: Sep. 8, 2014

(65) Prior Publication Data

US 2016/0070750 A1   Mar. 10, 2016

(51) Int. Cl.
   *G06F 17/00*   (2006.01)
   *G06F 17/30*   (2006.01)
   *G06F 3/0484*   (2013.01)

(52) U.S. Cl.
   CPC ....... *G06F 17/30424* (2013.01); *G06F 3/0484* (2013.01)

(58) Field of Classification Search
   CPC ............... G06F 17/30073; G06F 17/30; G06F 17/30214; G06F 17/30424
   USPC .................................................. 707/600–899
   See application file for complete search history.

(56) References Cited

U.S. PATENT DOCUMENTS

2013/0109995 A1*   5/2013   Rothman ............. G06K 9/6217
                                                600/544

* cited by examiner

*Primary Examiner* — Isaac M Woo
(74) *Attorney, Agent, or Firm* — Brake Hughes Bellermann LLP

(57) ABSTRACT

In accordance with aspects of the disclosure, systems and methods are provided for generating a reduced segment of a population set for a course of activities based on one or more distinction entities. The systems and methods may be configured to determine the population set for the course of activities. The population set may include a first number of members identified by a first distinction entity. The systems and methods may be configured to select a second distinction entity related to the first number of members of the population set. The systems and methods may be configured to generate the reduced segment of the population set for the course of activities by selecting a second number of members from the first number of members identified by the second distinction entity based on predetermined criteria.

19 Claims, 10 Drawing Sheets

200

202 — determining a population set for a course of activities, the population set including a first number of members identified by one or more distinction entities including a first distinction entity 204 — selecting a second distinction entity of the one or more distinction entities related to the first number of members of the population set 206 — generating a reduced segment of the population set for the course of activities by selecting a second number of members from the first number of members of the population set identified by the second distinction entity based on a predetermined criteria

322 — determine a population set for a campaign identified by a first distinction entity, the campaign including a first campaign and a second campaign, the population set including a first customer segment with a first number of members for the first campaign, the population set including a second customer segment with a second number of members for the second campaign

324 — select a second distinction entity related to the first number of members of the population set and the second number of members of the population set

326 — generate a reduced segment of the first segment of the population set for the first campaign by removing one or more members of the first number of members of the population set, if after comparing, the second distinction entity of one or more of the first number of members of the population set match the second distinction entity of one or more of the second number of members of the population set

FIG. 3B

DISTINCTION ENTITIES FOR SEGMENTATION

TECHNICAL FIELD

The present description relates to data segmentation.

BACKGROUND

In conventional computing environments, segmentation of large amounts of data may include filtering user defined criteria. Filter criteria used by developers are used to meet various objectives, such as data segmentation goals. In some scenarios, a developer may manage data segmentation based on manually implemented knowledge and experience. However, this conventional manual technique is difficult to coordinate, significantly time consuming, and highly complex for managing data segmentation when attempting to manually perform operations and functions.

SUMMARY

In accordance with aspects of the disclosure, a computer system may be provided, including instructions recorded on a computer-readable medium and executable by at least one processor. The computer system may include a segmentation manager configured to cause the at least one processor to generate a reduced segment of a population set for a course of activities based on one or more distinction entities. The segmentation manager of the system may include a set handler configured to determine the population set for the course of activities. The population set may include a first number of members identified by a first distinction entity of the one or more distinction entities. The segmentation manager of the system may include an entity handler configured to select a second distinction entity of the one or more distinction entities related to the first number of members of the population set. The segmentation manager of the system may include a segmentation engine configured to generate the reduced segment of the population set for the course of activities by selecting a second number of members from the first number of members of the population set identified by the second distinction entity based on predetermined criteria.

In accordance with aspects of the disclosure, a computer program product may be provided, wherein the computer program product is tangibly embodied on a non-transitory computer-readable storage medium and includes instructions that, when executed by at least one processor, may be configured to generate a reduced segment of a population set for a course of activities based on one or more distinction entities. The instructions may be configured to determine the population set for the course of activities, the population set including a first number of members identified by a first distinction entity of the or more distinction entities. The instructions may be configured to select a second distinction entity of the one or more distinction entities related to the first number of members of the population set. The instructions may be configured to generate the reduced segment of the population set for the course of activities by selecting a second number of members from the first number of members of the population set identified by the second distinction entity based on predetermined criteria.

In accordance with aspects of the disclosure, a computer-implemented method may be provided including determining a population set for a course of activities. The population set may include a first number of members identified by one or more distinction entities including a first distinction entity. The method may include selecting a second distinction entity of the one or more distinction entities related to the first number of members of the population set. The method may include generating a reduced segment of the population set for the course of activities by selecting a second number of members from the first number of members of the population set identified by the second distinction entity based on predetermined criteria.

In accordance with aspects of the disclosure, a computer program product may be provided, wherein the computer program product is tangibly embodied on a non-transitory computer-readable storage medium and includes instructions that, when executed by at least one processor, may be configured to determine a population set for a course of activities including a first course of activities and a second course of activities. The population set may include a first segment with a first number of members for the first course of activities, the population set including a second segment with a second number of members for the second course of activities. The instructions may be configured to select a second distinction entity from the first number of members of the population set and from the second number of members of the population set. The instructions may be configured to generate a reduced segment of the first segment of the population set for the first course of activities by removing one or more members of the first number of members of the population set, if after comparing, the second distinction entity of one or more of the first number of members of the population set match the second distinction entity of one or more of the second number of members of the population set.

The details of one or more implementations are set forth in the accompanying drawings and the description below. Other features will be apparent from the description and drawings, and from the claims.

BRIEF DESCRIPTION OF THE DRAWINGS

FIG. 2 is a process flow showing an example method, in accordance with aspects of the disclosure.

FIGS. 3A-3B are example process flows showing example methods, in accordance with aspects of the disclosure.

DETAILED DESCRIPTION

Figure 1:
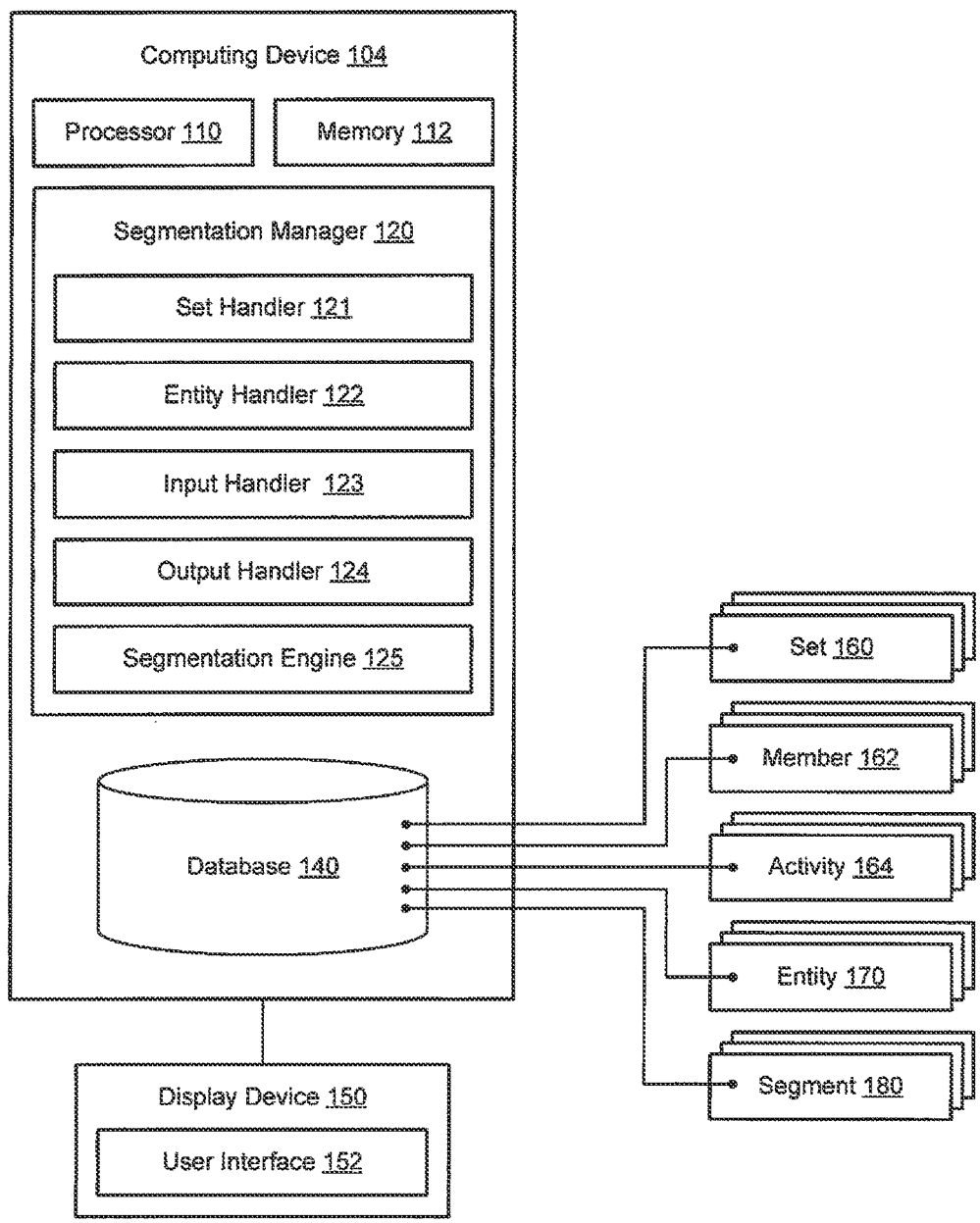
FIG. 1 is a block diagram showing an example system, in accordance with aspects of the disclosure.

FIG. 1 is an example block diagram illustrating an example system 100 for distinguishing members of a segmentation population based on one or more distinction entities, in accordance with aspects of the disclosure.

In the example of FIG. 1, the system 100 comprises a computer system for implementing various aspects of the disclosure that may be associated with a computing device 104, thereby transforming the computing device 104 into a special purpose machine designed to implement query optimization process(es), as described herein. In this instance, the computing device 104 may include standard element(s) and/or component(s), including at least one processor(s) 110, at least one memory 112 (e.g., non-transitory computer-readable storage medium), at least one database(s) 140, power, peripherals, and various other computing elements and/or components that may not be specifically shown in FIG. 1. Further, the system 100 may be associated with a display device 150 (e.g., a monitor or other display) that may be used to provide a user interface (UI) 152, such as, in various examples, a graphical user interface (GUI). In some examples, the UI 152 may be used to receive preferences from a user for managing or utilizing the system 100. As such, in some implementations, various other element(s) and/or component(s) of the system 100 that may be useful for purpose of implementing the system 100 may be added or included, as would be apparent to one of ordinary skill in the art.

In the example of FIG. 1, the system 100 may include the computing device 104 and instructions recorded on the non-transitory computer-readable medium 112 and executable by the at least one processor 110. The system 100 may include the display device 150 for providing output to a user, and the display device 150 may include the UI 152 for receiving input from the user and/or providing output to the user.

In various implementations, the system 100 may include a computer based system and related methods for distinguishing one or more members of a segmentation population based on one or more distinction entities. For instance, in some examples, the example system 100 may include a structured query language (SQL) relational database management system. Generally, in some examples, SQL may refer to a special-purpose programming language designed for managing various types of data held in a relational database management system (RDBMS). In some examples, SQL may refer to various types of data related languages including, e.g., a data definition language and a data manipulation language, where a scope of SQL may include data insert, query, update and delete, schema creation and modification, and data access control, and SQL may include procedural elements. Further, in some example, SQL may include descriptions related to various language elements, including clauses, expressions, predicates, queries, and statements. For instance, clauses may refer to constituent components of statements and queries, and in some instances, clauses may be considered optional. Further, expressions may be configured to produce scalar values and/or tables that may include columns and rows of data.

Further, predicates may be configured to specify conditions that may be evaluated to SQL three-valued logic (3VL) (true/false/unknown) and/or Boolean truth values, which may be used to moderate effects of statements and queries, and which may also be used to modify program flow.

Further, in other instances, queries may be configured to retrieve data from a database based on specified criteria. Generally, queries provide a means for users to describe data for retrieval from a database, thereby providing a database management system (DBMS) with responsibility for planning, optimizing, and/or performing physical operations necessary to produce various desired results. Statements may be configured to enable persistent effect on schemata and data, to thereby control, e.g., transactions, program flow, connections, sessions, and/or diagnostics.

In the example of FIG. 1, the system 100 may include a segmentation manager 120 configured to cause the at least one processor 110 to generate one or more reduced segments 180 of one or more population sets 160 for a course of one or more activities 164 based on one or more distinction entities 170. In some implementations, the segmentation manager 120 may be configured to generate a reduced segment 180 of a population set 160 for a course of activities 164 based on one or more distinction entities 170, including a first distinction entity and a second distinction entity.

The segmentation manager 120 may include a set handler 121 that may be configured to determine the population set 160 for the course of activities 164. In some implementations, the population set 160 may include a first number of members 162 identified by the first distinction entity of the one or more distinction entities 170. The set handler 121 may be configured to select the first number of members of the population set. The population set may relate, for example, to a set of customers and/or a set of products. In some examples, the course of activities may relate to a campaign or a business campaign including an ordered set of business related activities.

The segmentation manager 120 may include an entity handler 122 that may be configured to select a second distinction entity of the one or more distinction entities 170 related to the first number of members 162 of the population set 160. In some implementations, the entity handler 122 may be configured to select one or more of the one or more distinction entities, including the first distinction entity for the course of activities. The first distinction entity may relate to various business-related entities, such as, for example, customers targeted by the course of activities. The second distinction entity may relate to various business-related entities that may be different or similar to the first distinction entity, such as, for example, sales representatives assigned to the first distinction entity, which may be related to one or more other business-related entities, such as customers, products, etc. For instance, the second distinction entity may relate to sales representatives assigned to the first distinction entity related to customers, products, other business-related examples, and in some cases, non-business examples.

In some implementations, the business-related entities may include or may be associated with services offered for sale or for hire including data software services, data storage services, data management services, sales management services, product sales tracking services, employee tracking services, finance services, marketing services, advertising services including cellular/mobile phone services, Wi-Fi/Internet access and other broadband-related services, etc. Other business-related entities may include support for services related to customers/employees/products/services including services related to warehousing, inventories, retention, purchasing, settlement, delivery, etc. Still other business-related entities may include company-related support including human resource acquisition, management, and retention. Further, various other business-related entities may be included without departing form the scope of the disclosure.

In some implementations, the first distinction entity may relate to a primary segmentation object (PSO). In some examples, segmentation may use a primary segmentation object (PSO) to determine what is to be counted and by which keys various data sources are to be joined. Further, joining of data sources based on the PSO may necessitate PSO keys to be present in one or more or all data sources. As such, in some examples, the PSO may be a true segmentation object and the fact that its keys may be present in one or more or all data sources may distinguish it from a mere distinction entity, whether this be primary, secondary, or tertiary.

From a technical point, the PSO may be in effect an Object Type known from customizing, and the segmentation object key may therefore deal as a primary distinction entity. From a business point of view, the PSO may be a main object of interest of a segmentation profile. For example, a desire may exist for a customer to be counted, previewed, split, exported, etc., where the values of the PSO may be treated as distinct when counting, pre-viewing, etc.

In some implementations, the secondary distinction entity (SDE) may refer to a secondary entity separate and distinct from the first distinction entity. For instance, some feature requests may demand that certain segmentation operations (which may have been hitherto always executed from the perspective of the PSO) be executed from a shift in perspective, which may take distinct values of another, a secondary, entity into account (e.g., SDE). Thus, the secondary distinction entity (SDE) may be configured to define one or more attributes of a specific data source (e.g., country, region, etc.) that may significantly alter certain segmentation operations, such as, e.g., operations with distinct business semantics that may be enriched by the SDE aspect.

Further, in reference to the example of FIG. 1, the segmentation manager 120 may include a segmentation engine 125 that may be configured to generate the reduced segment 180 of the population set 160 for the course of activities 164. In some implementations, the reduced segment 180 of the population set 160 for the course of activities 164 may be generated by selecting a second number of members 162 from the first number of members 162 of the population set 160 that may be identified by the second distinction entity based on predetermined criteria. The second number of members may relate to a capacity including a predetermined capacity value related to the second distinction entity. The second number of members of the population set may be at least less than the first number of members of the population set.

In some implementations, the predetermined criteria may relate to at least one business related measurement value including a predetermined sales volume related to the first distinction entity. The predetermined criteria may be used and/or configured to restrict the reduced segment of the population set to a predetermined sales volume related to the first distinction entity.

In some implementations, the segmentation engine 125 may be configured to reduce the population set by selecting the second number of members from the first number of members of the population set identified by the second distinction entity based on the predetermined criteria. Further, in some examples, the segmentation engine 125 may be configured to remove one or more unselected members of the first number of members of the population set.

In the example of FIG. 1, the segmentation manager 120 may include an input handler 123 that may be configured to receive user input from a user via a graphical user interface, such as, e.g., the user interface 152. In some implementations, the user input may include data and/or information related to one or more or each of the first distinction entity, the second distinction entity, and the predetermined criteria.

In the example of FIG. 1, the segmentation manager 120 may include an output handler 124 that may be configured to display user output to a user via a graphical user interface, such as, e.g., the user interface 152. In some implementations, the user output may include data and/or information related to the first number of members of the population set and/or the second number of members of the reduced segment of the population set.

In accordance with aspects of the disclosure, SDE-enhanced operations may offer a mechanism (that may be implemented as a specific SQL based technique) to a user of the system 100 that allows the user to answer various business questions about data and/or information in one or more (e.g., at most two steps), where conventional techniques either fail to offer this functionality or do only through a cumbersome series of many steps and data exchanges. As such, within the present disclosure, the secondary distinction entity (SDE) may be used and/or implemented for various use cases (e.g., as described herein). However, the SDE may be relevant for other use cases, other than those described herein. Therefore, the concept of SDEs is unique, at least in reference to aspects of the disclosure.

In some implementations, SDE-enhanced operations may refer to various instances of population sets and SDE usage, including examples, such as customers, business campaign, sales representative, sales volume, and email addresses. However, aspects of the disclosure should not be restricted to only these specific usages, e.g., where population sets may include customers, SDEs may include email addresses and/or sales representatives, and predetermined capacity criteria may include sales volume. Instead, aspects of the disclosure also pertain to SDE usage that is not restricted to these specific instances, but such SDE usage may be defined in terms of its reductive capacity related to any primary object of interest. Accordingly, any object or entity may be considered or used as a secondary distinction entity, if from a user's point of view it relates to a primary entity. Further, the disclosed concept, technique, and implementation of SDEs may be configured to allow for defining/creating/generating composite SDEs, where a (logical) SDE may be composed of multiple (two or more) sub-entities, e.g., "country" and "sales organization" may be combined into a "regional sales" SDE that may be used to discern at a higher level of granularity among members of a population set.

In the example of FIG. 1, the secondary distinction entity may distinguish members of a segmentation population (e.g., population set). In some implementations, the segmentation engine 125 may be used and/or configured for audience discovery and targeting to thereby support finding a preferred set of members (e.g., various customers or products) for a specific business case (e.g., a campaign, including a course of one or more activities). The set of members (e.g., the segmentation population) may be reduced via operations, where for each a new segment may be created/generated. In some examples, each segment may be configured to show a count of remaining distinct members. In other examples, one or more or all segmentation steps may operate on these distinct members by default.

In an example, a process may start with one or more or all customers (e.g., a segment with 15,000 customers), which may be reduced to those located in a specific region or country (e.g., a segment with 8,000 customers). Next, the process may restrict the set (e.g., population set) to those customers having a sales volume of more than a specific value (e.g., $1,000), which may result in a reduced segment of customers (e.g., 2,700 customers). An issue that may arise is that, for certain use cases, it may be required to also operate on entities that are not member entities of the set.

For instance, a campaign may be executed by a certain number of sales representatives (e.g., 110), where each may be assigned to certain customers and having a capacity to contact a certain number of customers (e.g., at most 5 customers). Hence, a segment may be created/generated including a predetermined selection (e.g., at most 5 customers per sales representative). In this example, the sales representative may be referred to as another (non-member) entity, such as a secondary entity.

In some examples, similar use cases may include a number (e.g., 5) of customers with a highest sales volume per sales representative, or a number (e.g., 5) of customers with a lowest return rate per sales representative, instead of any a number (e.g., 5) of customers per sales representative. Further, in some other examples, it may be possible to perform one or more set operations (e.g., union, intersect, subtract, etc.) on one or more (e.g., two) existing segments, for which it may be required to provide additional functional operation on one or more different entities.

For instance, two customer segments may be provided for two similar email-campaigns (e.g., offering different conditions). Some customers may share a same email-address, where when sending different offers to a single email address may not be desirable, it may be desirable to ensure that customers sharing the same email-address are only included in one segment. In this example, the email address may be considered the other entity, e.g., a secondary entity.

In some implementations, distinct members of a segmentation population may be identified by a segmentation object, which may thus be considered a primary distinction entity. In some use cases, it may not be sufficient to operate on the primary distinction entity alone (e.g., customers alone). Apart from filter criteria (e.g., country=US), a secondary entity may need to be taken into account when reducing members of a population set. Thus, in some implementations, the concept of the secondary distinction entity (SDE) may be introduced for segmentation operations, where an according use case may exist. In some instances, the secondary distinction entity may not be referred to as a secondary segmentation object, because any resulting segment and its count may still reflect the primary distinction entity, which may not be desirable.

In some implementations, the secondary distinction entity may be used in one or two semantically different ways within the segmentation, e.g., a "per"-semantic basis, and a "by"-semantic basis. For instance, in some examples, the "per"-semantic basis may be used for top, bottom, or random with N or N % operations.

In an example, for top N, the top 5 customers per sales representative may be selected by sales volume, with the numbers above this results in a segment including at most 550 customers (at most 5 customers*110 sales representatives). The selection may operate as follows. First, one or more or all distinct sales representatives may be selected from the source segment. Next, for each distinct sales representative, the top 5 distinct customers may be selected by sales volume. Next, a new segment may be created with one or more or all distinct customers selected previously.

In some other examples, the "by"-semantic may be used for creating groups of disjoint segments and for set-operations. In an example, for the set operation subtract, one or more or all customers in segment B may be subtracted by email-address from segment A. The selection may operate as follows. First, distinct email-addresses for each source segment may be selected, e.g., resulting in two lists of email-addresses, list A and list B. Next, one or more or all email-addresses may be removed from list A that appear in list B, where the reduced list for A is list A'. Next, a new segment with one or more or all customers may be created having an email-address from list A'. In some examples, the SDE-operations may be most comprehensible if the relation of the primary distinction entity to the secondary distinction entity is n:1.

As examples provided herein may demonstrate, definition and application of a secondary entity for the purpose of reducing a member population may introduce an additional, powerful tool to satisfy specific business needs. Such segmentation tasks may not be achieved (or possibly only in an indirect and cumbersome manner) by application of ordinary, conventional filter criteria alone. In another examples, another approach to cover use cases and examples introduced herein may be to completely switch to another distinction entity (e.g., sales representative or email-address) with a defined segmentation action resulting in a new segment.

This approach may imply the new segment to show a distinct count of the other distinction entity. The segments within one segment tree may represent different segmentation objects as distinction entities. The full switch between different distinction entities may lead to a more complex segment tree, where an additional switch-pre-step may be necessary to create a segment that reflects the other distinction entity, and to carry out a desired segmentation operation on the other distinction entity segment. Further, an additional switch-post-step may be necessary to create a segment that may reflect the original distinction entity. This may result in three segments instead of one new segment.

In various examples, this may lead to complexity for users carrying out a desired segmentation operation. For instance, complexity within a segmentation tree may increase, since the tree may become larger and segments have different semantics with respect to their distinction entity. In some instances, this may lead to a higher probability for users choosing the wrong segmentation operation. In other instances, this approach may also lead to a higher technical complexity and higher implementation costs.

In some implementations, this approach may lead to a higher total cost of ownership for customers. Thus, secondary distinction entities may be used to optimize usability (e.g., ease of understanding, clarity, and/or robustness), supportability, and total cost of ownership for some specified use cases.

In the example of FIG. 1, the computer system 100 may include one or more databases (e.g., database 140) that may be configured to store data and information related to one or more sets 160 including the population set, one or more members 162 including the first number of members and the second number of members, and the one or more activities 164 including the course of activities. The one or more databases (e.g., database 140) may be configured to store data and information related to the one or more entities 170 including the first distinction entity, the second distinction entity, and one or more other distinction entities. Further, the one or more databases (e.g., database 140) may be configured to store data and information related to the one or more segments 180 including the reduced segments and one or more other reduced segments.

In the example of FIG. 1, it should be appreciated that the system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1. As such, it should be appreciated that conventional functionality that may be considered useful to the system 100 of FIG. 1 may be included as well even though such conventional elements are not illustrated explicitly, for the sake of clarity and convenience.

FIG. 2 is an example process flow illustrating an example method 200 for distinguishing members of a segmentation population based on one or more distinction entities, in accordance with aspects of the disclosure.

In the example of FIG. 2, operations 202-206 are illustrated as discrete operations occurring in sequential order. However, it should be appreciated that, in other various implementations, two or more of the operations 202-206 may occur in a partially or completely overlapping or parallel manner, or in a nested or looped manner, or may occur in a different order than that shown. Further, additional operations, that may not be specifically shown in the example of FIG. 2, may be included in some implementations, while, in various other implementations, one or more of the operations 202-206 may be omitted. Further, in various implementations, the method 200 may include a process flow for a computer-implemented method in the system 100 of FIG. 1. Further, as described herein, the operations 202-206 may provide a simplified operational process flow that may be enacted by the computer system 104 to provide features and functionalities as described in reference to FIG. 1.

In aspects of the disclosure, the method 200 of FIG. 2 may be provided for generating a reduced segment of a population set for a course of activities based on one or more distinction entities.

At 202, the method 200 may include determining the population set for the course of activities (e.g., business campaign). In some examples, the population set may include a first number of members identified by a first distinction entity (e.g., customers) of the or more distinction entities.

At 204, the method 200 may include selecting a second distinction entity (e.g., sales representatives) of the one or more distinction entities related to the first number of members of the population set.

At 206, the method 200 may include generating the reduced segment of the population set for the course of activities by selecting a second number of members from the first number of members of the population set identified by the second distinction entity based on predetermined criteria (e.g., sales volume).

In some implementations, the method 200 may include selecting the first distinction entity (e.g., customers) for the course of activities (e.g., business campaign) and/or selecting the first number of members of the population set. The method may include receiving user input from a user via a graphical user interface, the user input including information related to each of the first distinction entity, the second distinction entity, and the predetermined criteria. The method may include displaying user output to a user via a graphical user interface, the user output including information related to the first number of members of the population set and the second number of members of the reduced segment of the population set.

In some implementations, the population set may relate to one or more sets of customers and/or one or more sets of products. The course of activities may relate to a business campaign including an ordered set of business related activities. The first distinction entity may relate to one or more customers targeted by the course of activities, and/or the second distinction entity may relate to one or more sales representatives assigned to the first distinction entity. The second number of members may relate to a capacity including a predetermined capacity and/or predetermined capacity value related to one or more of the distinction entities including the second distinction entity.

In some implementations, the predetermined criteria may relate to one or more business related measurement values including at least one predetermined sales volume related to the first distinction entity. The predetermined criteria may restrict the reduced segment of the population set to a predetermined sales volume related to the first distinction entity. The second number of members of the population set may be at least less than the first number of members of the population set.

In some implementations, the method 200 may include generating the reduced segment of the population set for the course of activities including reducing the population set by selecting the second number of members from the first number of members of the population set identified by the second distinction entity based on the predetermined criteria and removing unselected members of the first number of members of the population set.

Figure 3A:
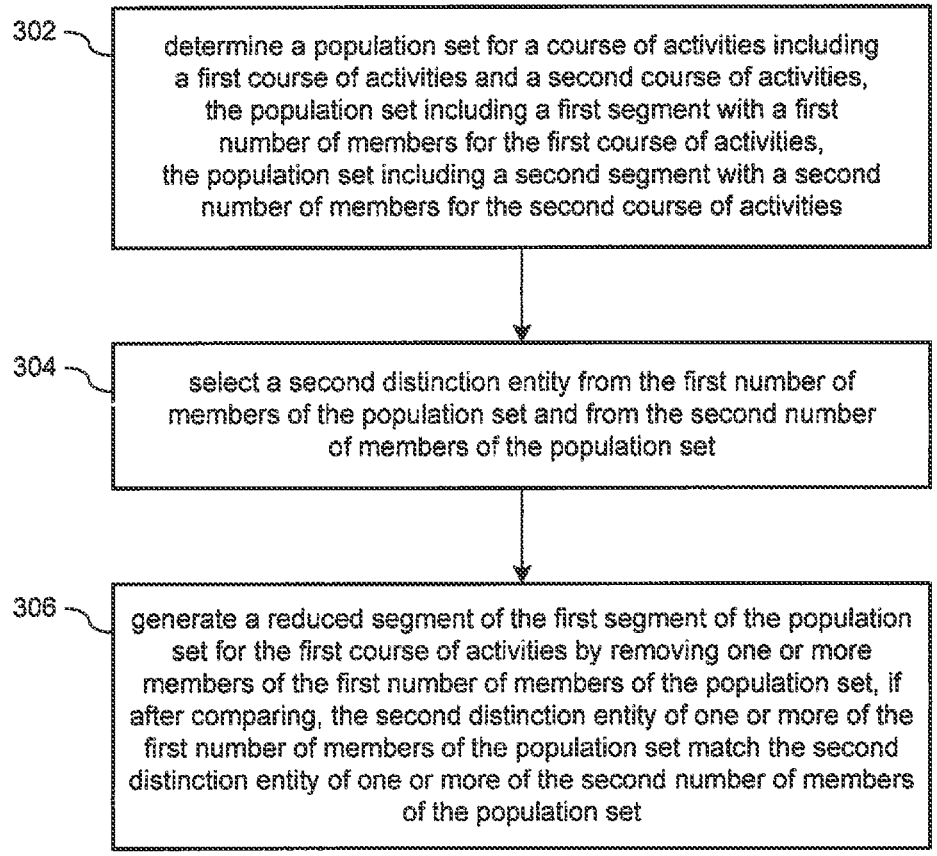

FIG. 3A is another example process flow illustrating another example method 300 for distinguishing members of a segmentation population based on one or more distinction entities, in accordance with aspects of the disclosure.

In the example of FIG. 3A, operations 302-306 are illustrated as discrete operations occurring in sequential order. However, it should be appreciated that, in other various implementations, two or more of the operations 302-306 may occur in a partially or completely overlapping or parallel manner, or in a nested or looped manner, or may occur in a different order than that shown. Further, additional operations, that may not be specifically shown in the example of FIG. 3A, may be included in some implementations, while, in various other implementations, one or more of the operations 302-306 may be omitted. Further, in various implementations, the method 300 may include a process flow for a computer-implemented method in the system 100 of FIG. 1. Further, as described herein, the operations 302-306 may provide a simplified operational process flow that may be enacted by the computer system 104 to provide features and functionalities as described in reference to FIG. 1.

In aspects of the disclosure, the method 300 of FIG. 3A may be provided for generating a reduced segment of a population set for a course of activities based on one or more distinction entities.

At 302, the method 300 may include determining a population set for a course of activities including a first course of activities and a second course of activities. In some examples, the population set may include a first segment with a first number of members for the first course of activities. Further, the population set may include a second segment with a second number of members for the second course of activities.

At 304, the method 300 may include selecting a second distinction entity (e.g., email address) from the first number of members of the population set and from the second number of members of the population set.

At 306, the method 300 may include generating a reduced segment of the first segment of the population set for the first course of activities by removing one or more members of the first number of members of the population set, if after comparing, the second distinction entity (e.g., email address) of one or more of the first number of members of the population set match the second distinction entity (e.g., email address) of one or more of the second number of members of the population set.

In some implementations, the method 300 may include selecting a second number of members from the first number of members of the population set identified by the second distinction entity (e.g., sales representatives) based on predetermined criteria (e.g., sales volume). Further, in some implementations, the method 300 may include comparing the second distinction entity (e.g., email address) of the first number of members of the population set to the second distinction entity (e.g., email address) of the second number of members of the population set. In some implementations, this may include retaining only those members of both the first and second population sets, if after comparing, the second distinction entity (e.g., email address) of one or more of the first number of members of the population set match the second distinction entity (e.g., email address) of one or more of the second number of members of the population set.

FIG. 3B is another example process flow illustrating another example method 320 for distinguishing members of a segmentation population based on one or more distinction entities, in accordance with aspects of the disclosure.

In the example of FIG. 3B, operations 322-326 are illustrated as discrete operations occurring in sequential order. However, it should be appreciated that, in other various implementations, two or more of the operations 322-326 may occur in a partially or completely overlapping or parallel manner, or in a nested or looped manner, or may occur in a different order than that shown. Further, additional operations, that may not be specifically shown in the example of FIG. 3B, may be included in some implementations, while, in various other implementations, one or more of the operations 322-326 may be omitted. Further, in various implementations, the method 300 may include a process flow for a computer-implemented method in the system 100 of FIG. 1. Further, as described herein, the operations 322-326 may provide a simplified operational process flow that may be enacted by the computer system 104 to provide features and functionalities as described in reference to FIG. 1.

In aspects of the disclosure, the method 320 of FIG. 3B may be provided for generating a reduced segment of a population set for a campaign including, e.g., a course of activities based on one or more distinction entities.

At 322, the method 320 may include determining a population set for a campaign identified by a first distinction entity. In some examples, the campaign may include a first campaign and a second campaign. The population set may include a first customer segment with a first number of members for the first campaign. The population set may include a second customer segment with a second number of members for the second campaign. In some examples, the first campaign may include a first course of activities, and the second campaign may include a second course of activities.

At 324, the method 320 may include selecting a second distinction entity related to the first number of members of the population set and the second number of members of the population set. In some examples, the first distinction entity may relate to customers, and the second distinction entity may relate to email addresses.

At 326, the method 320 may include generating a reduced segment of the first segment of the population set for the first campaign by removing one or more members of the first number of members of the population set, if after comparing, the second distinction entity of one or more of the first number of members of the population set match the second distinction entity of one or more of the second number of members of the population set.

Alternately, at 326, the method 320 may include generating a combined segment of the first segment of the population set for the first course of activities and of the second segment of the population set for the second course of activities by retaining one or more members of the first number of members of the population set and one or more members of the second number of members of the population set, if after comparing, the second distinction entity of one or more of the first number of members of the population set match the second distinction entity of one or more of the second number of members of the population set.

In some implementations, the method 320 may include selecting the second number of members from the first number of members of the population set identified by the second distinction entity based on predetermined criteria.

In some implementations, the method 320 may include comparing the second distinction entity of the first number of members of the population set to the second distinction entity of the second number of members of the population set.

In accordance with aspects of the disclosure, various techniques may be provided for segmentation as a chain of reductive steps. For instance, a segmentation application may be, at least in part, interpreted and/or implemented as a tool where a user with a specific business question or requirement may perform one or more successive reductive operations on a base population (e.g., population set). These steps may result in a smaller segment that may satisfy a user's original requirement or question. The answer or result may count equal to or at least greater than zero. In some examples, this view may not be exhaustive, but it may be chosen here as background to further understand how and why a secondary distinction entity (SDE) may offer a unique value and/or functionality for the segmentation application, and further may offer a quick mechanism to the user for answering their business questions.

For example, from a base population of 20 million customers, a user may want to know how many customers reside in the US. The user may perform a reductive operation (e.g., Country=US) on the base population. The resulting segment may represent this reductive step, and the count associated with it, such as, for example, one or more or all customers from the base population that may reside in the US (e.g., 7.8 million). Technically, this reductive operation may result in a generated SQL statement with a simple WHERE clause on the database table with one or more or all customers.

Next, in this example, the user may want to know which of the one or more or all of his customers did buy something. So, for each customer, the customer may aggregate revenue and select those customers that have, e.g., a revenue greater zero. This reductive step may be different from the first reductive operation above, since it involves aggregation on a key figure. Technically, in SQL, this may correspond to a aggregation function (e.g., sum( ) GROUP and HAVING clause.

Further, in this example, in a third reductive step, the user may want to know with which of his US customers the revenue was greater zero. The user may then intersect the two previously created segments and create a third, smaller segment that includes one or more or all US customers for which the user's business and/or company achieved a positive revenue. Technically, this may be a different reductive operation, e.g., a set operation, and leads to the INTERSECT of two subsets in SQL.

These examples may serve to illustrate a few different types of reductive operations that the segmentation application may offer. These may be based on one or more of the following: simple filter criteria of non-countable characteristics, reduction by aggregated (summable) key figures, and reduction via set operations (e.g., INTERSECT, SUBTRACT, etc.) or combination via UNION. In other examples, additional reductive operations offered by the application may include one or more of the following: top/bottom N or N % entries that may satisfy an aggregatable key figure threshold, randomized reduction of entries to N or N % original size, randomized split of entries into 2 or more disjoint subgroups, and one or more various other reductive operations.

In some implementations, it may be important to notice that one or more of the above mentioned reductive operations may operate directly and/or exclusively on one or more objects of primary interest, e.g., the customer in some examples. This may refer to filter criteria, key figure conditions, set operations, and/or randomized entry selections that may be related directly to this primary object of interest. While these few operations when combined together in a more elaborate segmentation model may already answer many user's questions about their data, and meet some business requirements, sometimes this may not be enough. In various examples, certain business requirements may not be fulfilled by combination of operations above, or only by a longer sequence of combining various operations. In some other examples, these special requirements may involve additional reductive, secondary dimension whereby the primary object of interest may be indirectly selected, filtered, and/or reduced.

Accordingly, aspects of the disclosure may provide and/or implement one or more additional, SDE-enhanced, reductive operations, that may be orthogonal to the operations described herein. For instance, operations may include: Top N/N5, Bottom N/N % by SDE, randomized reduction by SDE, randomized group split by SDE, subtract by SDE, and intersect by SDE.

Further examples of meanings/semantics of these operations are provided in greater detail herein. In various implementations, these operations are different in their functionality and outcome when compared to their non-SDE enabled counterparts.

In accordance with aspects of the disclosure, these special SDE-enhanced operations may be configured to offer a mechanism (e.g., implemented as specific SQL based techniques) that may allow a user to answer business questions about data in one or more (e.g., at most two steps), where conventional techniques either fail to offer this functionality or do so through a cumbersome series of steps and data exchanges.

In various implementations, aspects of the disclosure refer to a system including a segmentation engine for audience discovery and targeting configured to support finding a specific set of members (e.g. a set of customers, a set of products, etc.) for a specific business case (e.g. a campaign). The set of members (e.g., segmentation population set) may be reduced via segmentation steps, where a segment is created for each step. In some examples, each segment may be visualized on a user interface as a rectangle with a number, which shows a distinct count of remaining members of this segmentation step. I.e., this count may be calculated by selecting distinct members per segment, where segmentation steps may operate on these distinct members by default.

In an example, a technique may start with a set including customers (e.g., segment with 15,000 customers), which are reduced to those customers located in the US (e.g., segment with 8,000 customers). In a next step, the technique may restrict the set to those customers having a sales volume of more than $1,000 (e.g., which may result in a segment with 2,700 customers). In this scenario, reduction of the population of members that are of primary interest (e.g., customers) into segments of distinct members may be directly and/or exclusively governed by filter criteria applied in each segmentation step (e.g., country=US, sales volume greater $1,000, etc.).

In some examples, the problem may be that, for certain use cases, it may be necessary to operate on entities that are not member entities. That is, apart from filter criteria, secondary entities may need to be taken into account that may govern how the population of the (primary) members may be reduced to a new, smaller segment of distinct members to satisfy a certain use case. Hence, the secondary entities may refer to secondary distinction entities. Apart from ordinary filter criteria, these secondary entities may present one or more additional modes of operation that may be configured to reduce a primary member population to smaller segments of distinct members.

For example, a campaign may be executed by 110 sales representatives, where each assigned to one or more customers, and with each sales representative having a capacity to contact a maximum of 5 customers within that campaign. Further, the set may be reduced to 2700 customers to include a maximum of 5 customers per assigned sales representative. If there are more customers for one or more sales representatives, the customers with the highest sales volume may be kept. As such, in this example, per each sales representative, those 5 customers may be kept in a new segment that has the highest sales volume. In this example, the sales representative is the other (non-member) entity. As this scenario demonstrates, the reduction of the customers may be governed by a combination of two independent (or orthogonal) reductive modes that may thus lead to a two-dimensional (2D) segmentation operation, as follows: take a max of 5 customers per individual sales representative, and if there are more customers per individual sales representative, then take or keep those customers with the highest sales volume.

Clearly, apart from the filter criteria "top sales volume", this segmentation step may be additionally governed by a secondary distinction entity, such as, for example, the sales representative. When applied together and in combination, filter criteria ("Sales Volume") and customer relation to a specific secondary entity ("Sales Representative") may satisfy this business requirement of, "picking the most promising customers that my limited sales force can still handle".

Besides the "top" selector described above, the reductive quality of such secondary entities may be fruitfully combined with other selectors: there is a "bottom" (e.g., five customers with the lowest satisfaction level) and "random" (e.g., any five customers) selector. In addition, it may be possible to perform one or more set operations (e.g., intersect, subtract, etc.) on two existing segments. For intersect and subtract, it may be configured to operate on a different entity.

In an example, two customer segments (e.g., A and B) may be used for two similar email-campaigns (e.g., one campaign offering better conditions for better customers). Two or more customers (e.g., members of a family) may share a same email-address but may get distributed into separate segments. In this example, sending two different offers to one and the same email-address may not be desirable, and as such, customers sharing the same email-address may be include in one segment. In this case, the email-address may be referred to as the other, secondary entity.

As these examples demonstrate, definition and application of a secondary distinction entity for purpose of reducing a member population introduces an additional, powerful tool to satisfy specific business needs. Such segmentation tasks may not be achieved (e.g., or only in an indirect and cumbersome manner) by application of ordinary filter criteria alone.

The distinct members of a segmentation population may be identified by a segmentation object key. The segmentation steps may operate on these distinct members by default. The segmentation steps may reduce the set of members with respect to their segmentation object keys. Therefore, the segmentation object (that may be technically described by its object keys) may be the primary distinction entity.

In these use cases, it may not be considered sufficient to operate on the primary distinction entity (e.g., the customers), but on a secondary differentiator, such as, for example, sales representative, email-address, etc. Thus, a secondary distinction entity may be introduced for specific segmentation operations. In some implementations, the secondary distinction entity may not be referred to as a secondary segmentation object, because the resulting segment and its count may still reflect the primary distinction entity (i.e., the segmentation object with its object keys).

In some examples, the secondary distinction entity may be used in two semantically different ways within the segmentation operations, such as, for example, on a "per" and/or "based-on" context or basis. For example, "per"-semantic within a segmentation step may include Top N/Top % of primary distinction entity per secondary distinction entity, where the top five customers per sales representative are selected by sales volume. In another example, this operation may result in a segment including a maximum 550 customers (maximum 5 customers*110 sales representatives). In another example, all distinct sales representatives from a source segment are selected; for each distinct sales representative, the top five customers are selected by sales volume; and all selected customers are merged into one new segment. In another example, the top 10% customers per sales representative are selected by sales volume.

In some implementations, "per"-semantic within a segmentation step may include Bottom N/Bottom % of the primary distinction entity per the secondary distinction entity. The bottom eight customers per sales representative may be selected by customer satisfaction. The bottom 15% customers per sales representative may be selected by customer satisfaction.

In some implementations, "per"-semantic within a segmentation step may include Random N/Random % of the primary distinction entity per the secondary distinction entity. Any twenty customers may be selected per sales representative. Any 12% customers may be selected per sales representative.

In some implementations, "based-on"-semantic within a Set-Operation for combining two segments may include intersection of the primary distinction entity based on the secondary distinction entity. All customers from segments A and B may intersect by email-address to identify customers with overlapping email-addresses.

In an example, distinct email-addresses may be selected for each source segment, e.g., resulting in two lists of email-addresses. All email-addresses that appear on both lists may be selected. A new segment may be created with all customers for the email-addresses selected previously.

In some examples, the primary distinction entity may be subtracted based secondary distinction entity. All customers from segment A whose email-address appears as well for customers of segment B may be subtracted.

In some examples, "based-on"-semantic within a Random-Split Segment-Operation may include Random-Split of the primary distinction entities based on the secondary distinction entity. Randomly split all customers into three segments (e.g., 80%, 10%, 10%) based on their country.

In an example, all distinct countries may be selected for a source segment; the countries may be randomly split into three parts according to the given percentages; and a new segment may be created for each of the three parts with the customers derived from the countries. In some examples, the number of customers may not necessarily adhere to the percentage-distribution provided by the user, since that distribution may be applied to the secondary and not the primary distinction entity.

Another approach to cover the use cases and examples introduced herein may be to completely switch to another distinction entity (e.g., the sales representative, email-address, etc.) with a defined segmentation action resulting in a new segment. This approach (which may be implemented by some competitors) implies:

In some examples, the new segment may show a distinct count of the other distinction entity. The segments within one segment tree represent different segmentation objects as distinction entities. The full switch between different distinction entities leads to a more complex segment tree: an additional switch-pre-step becomes necessary to create a segment which reflects the other distinction entity; carry out the desired segmentation operation on the other distinction entity segment; an additional switch-post-step becomes necessary to create a segment which again reflects the original distinction entity; and this results in three instead of one new segment.

In various implementations, this may lead to complexity for users carrying out desired segmentation operations. Complexity within a segmentation tree may or may not increase, when the tree becomes larger, and segments have different semantics with respect to their distinction entity. This may lead to higher probability for users choosing a wrong segmentation operation. This approach may lead to higher technical complexity and higher implementation costs. Increased complexity for users and increased technical complexity may lead to higher total cost of ownership for customers, businesses, and/or companies. Therefore, secondary distinction entities may optimize usability (e.g., ease of understanding, clarity, robustness, etc.), supportability and total cost of ownership.

FIGS. 4-11 are example screenshots illustrating various example use cases for a secondary distinction entity, in accordance with aspects of the disclosure.

In various implementations, aspects of special SDE-enhanced operations refer to a mechanism (e.g., implemented as a specific SQL based technique) that allows a user to answer various business questions about data and/or information in one or more (e.g., two steps) through unique techniques that offer efficient operation and functionality without cumbersome series of steps and complex data exchanges. Further, within various applications, the secondary distinction entity (SDE) may be used and implemented for the use cases as described herein. However, the SDE may be relevant for other use cases.

Figure 4:
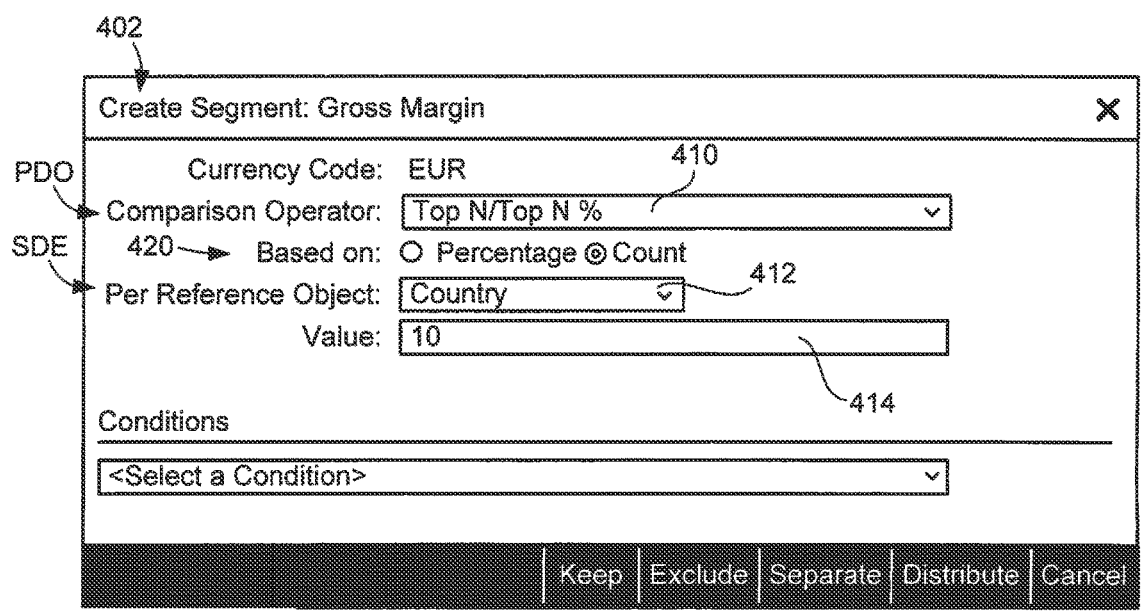
FIG. 4 is an example screenshot illustrating an example use case for a secondary distinction entity, in accordance with aspects of the disclosure.

FIG. 4 is an example screenshot illustrating an example use case 400 for a secondary distinction entity, in accordance with aspects of the disclosure.

As described in reference to the example of FIG. 1, the segmentation manager 120 may include the input handler 123 that may be configured to receive user input from a user via a graphical user interface (UI), such as, e.g., the UI 152. In the example of FIG. 4, user input for the example use case 400 may include selection of data and/or information related to an operation 402 of creating a segment with use of one or more distinction entities, such as a first distinction entity 410 (i.e., PDO), a second distinction entity 412 (i.e., SDE), and predetermined criteria (i.e., value).

As described herein, the secondary distinction entity (SDE) may be used in semantically different ways within segmentation operations, such as, for example, in a "per"- and a "based-on" semantic basis.

For instance, in some implementations, the "per"-semantic may be used within a segmentation operation 402 for creating a segment for gross margin. As shown in the example of FIG. 4, a comparison operator may be selected for the Top N/Top % of primary distinction entity PDO 410 per secondary distinction entity SDE 412 (e.g., country, including in some other examples, country-region, country-city, etc.) with the predetermined criteria 414 having, e.g., a value of 10. In this instance, the example operation 402 refers to selecting ten customers having a highest gross margin (e.g., the top 10 customers), but select them per country (SDE 412). In the example of FIG. 4, the example operation 402 selects the top ten customers for every country per SDE 412. In some examples, the value of the predetermined criteria 414 may be represented by (or based on) a selection of either percentage or count 420.

Further, in some examples, a currency code 422 may be selected, e.g., EUR, to reflect the European Union currency. However, in other examples, various other currencies, e.g., US Dollar, may be selected.

Figure 5:
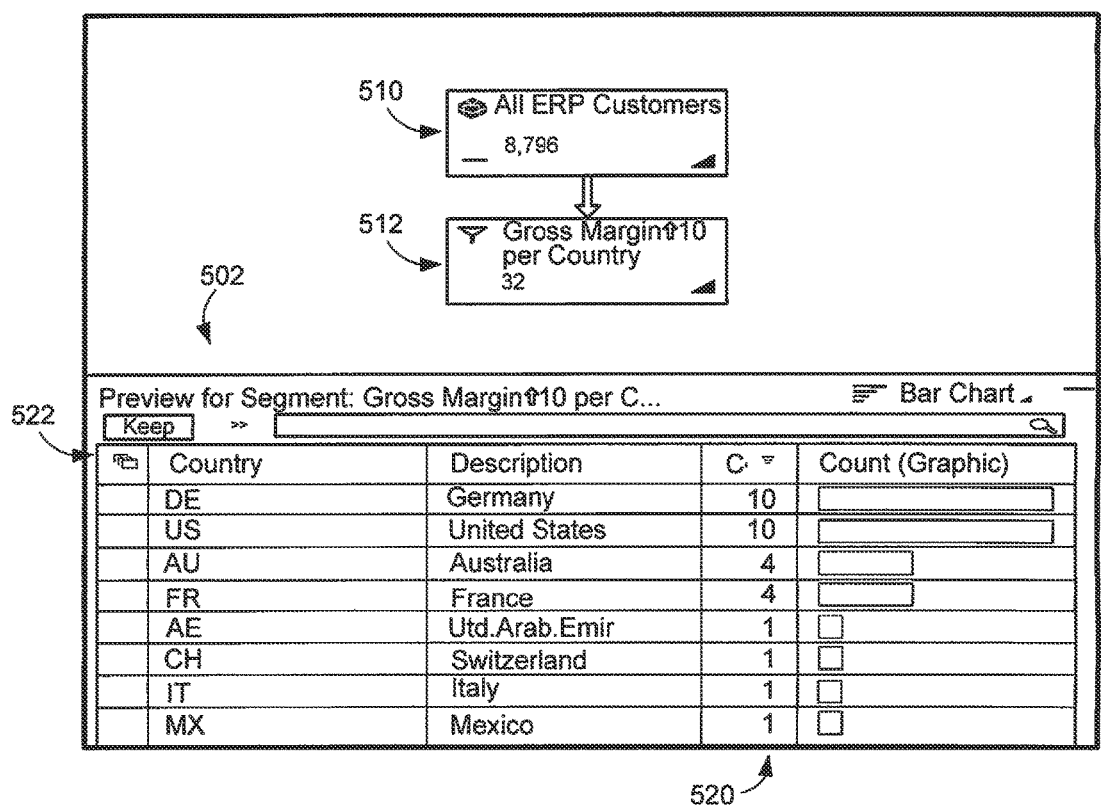
FIG. 5 is an example screenshot illustrating an example output for the example use case of FIG. 4 in reference to a secondary distinction entity, in accordance with aspects of the disclosure.

The resulting customers are distributed across the countries as visualized in a preview on a lower end of the screenshot of FIG. 5.

FIG. 5 is an example screenshot illustrating an example output for the example use case 400 of FIG. 4 in reference to a secondary distinction entity 412, in accordance with aspects of the disclosure.

As described in reference to the example of FIG. 1, the segmentation manager 120 may include the output handler 124 that may be configured to display user output to a user via a graphical user interface, such as, e.g., the UI 152. In the example of FIG. 5, user output for the example use case 400 may include data and/or information related to the first number of members 510 of the population set (e.g., 8,796 customers) and/or the second number of members 512 of the reduced segment of the population set (e.g., 32 customers).

For instance, in some implementations, the resulting customers 520 may be distributed across various countries 522 as visualized in a preview 502 on a lower end of the screenshot 500. This may imply that for countries other than Germany and US, there are not more than 10 customers with any gross margin at all.

Figure 6:
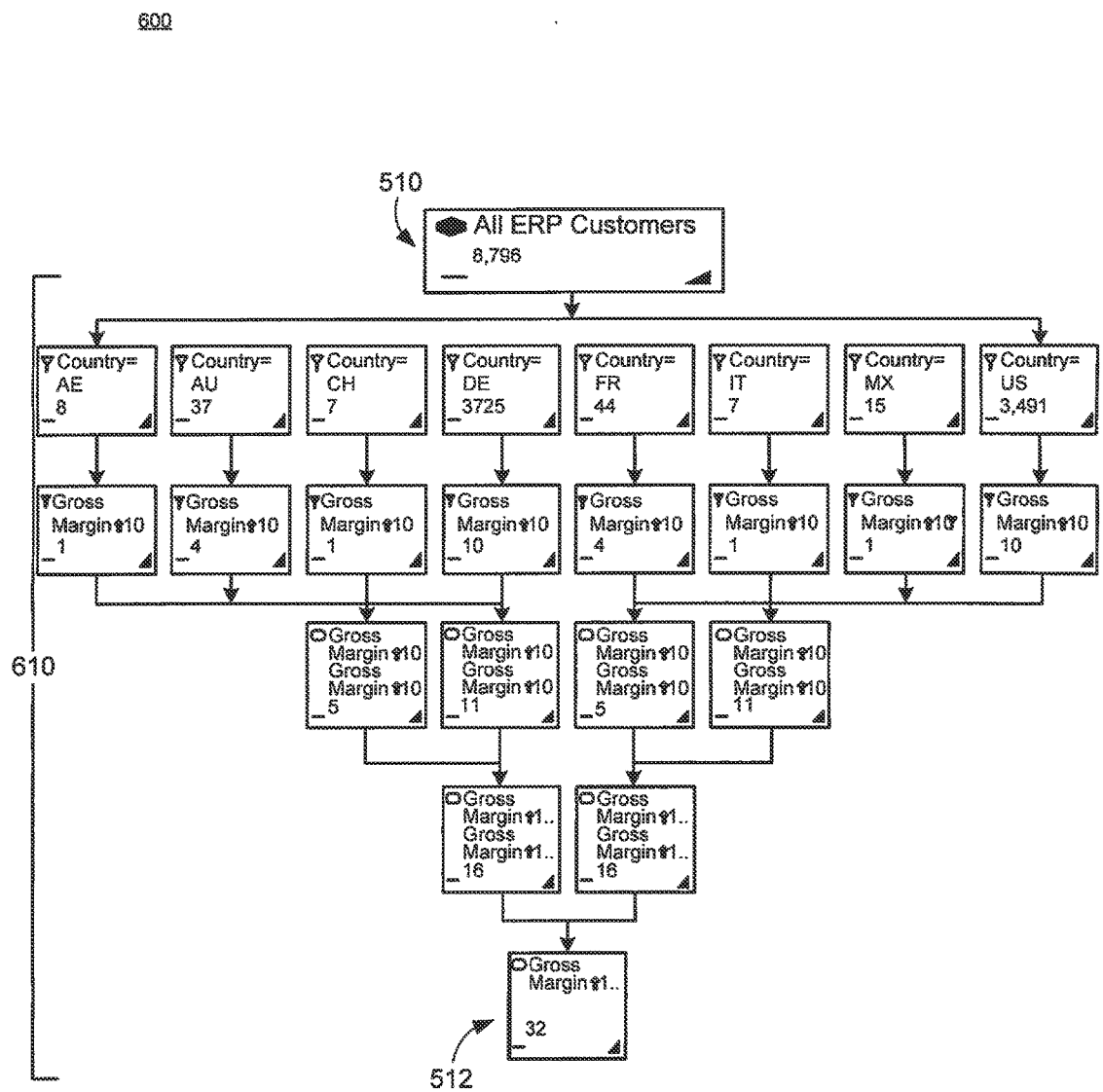
FIG. 6 is an example screenshot illustrating an example output tree for the example use case of FIG. 4 in reference to a secondary distinction entity, in accordance with aspects of the disclosure.

FIG. 6 is an example screenshot illustrating an example output tree 600 for the example use case 400 of FIG. 4 in reference to a secondary distinction entity 412, in accordance with aspects of the disclosure.

In the example output tree of FIG. 6, user output for the example use case 400 may include data and/or information related to the first number of members 510 of the population set (e.g., 8,796 customers) and/or the second number of members 512 of the reduced segment of the population set (e.g., 32 customers).

This approach may imply the new segment to show a distinct count for each country of the countries 522. The segments within one segment tree may represent different segmentation objects as distinction entities. As shown in the example of FIG. 6, a full switch between different distinction entities may lead to a more complex segment tree, where an additional switch-pre-step may be necessary to create a segment that reflects the other distinction entity, and to carry out a desired segmentation operation on the other distinction entity segment. An additional switch-post-step may be necessary to create a segment that may reflect the original distinction entity. As shown in FIG. 6, without use of the SDE 512, the same task may have taken many more steps 610 and time as needed to apply a "Top 10 Gross Margin"-Filter on each and every country manually, followed by merging all of them together into one segment/dataset.

Figure 7:
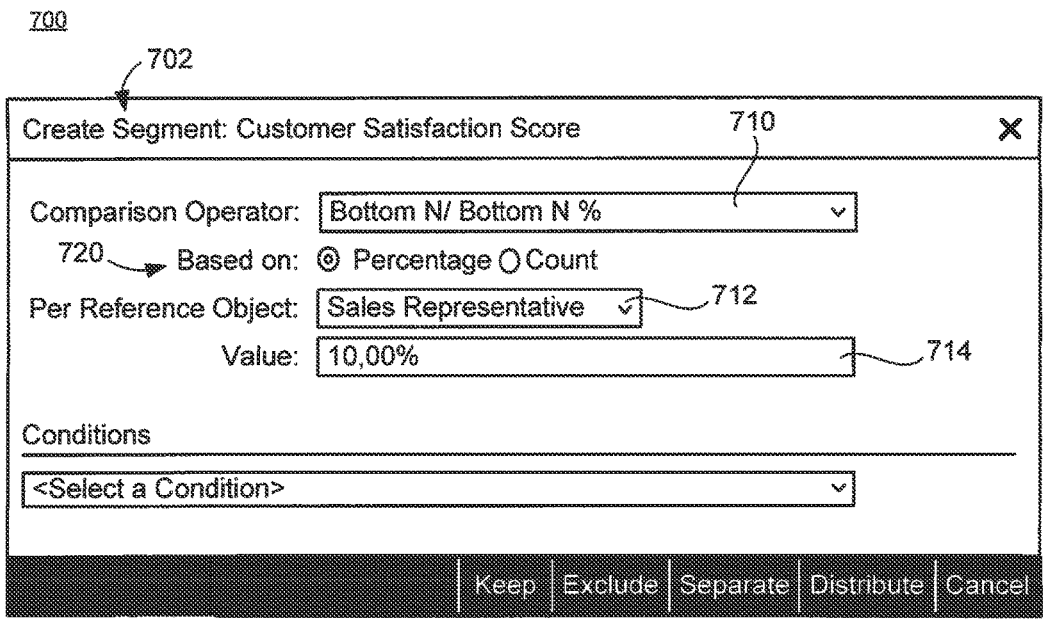
FIG. 7 is another example screenshot illustrating another example use case for a secondary distinction entity, in accordance with aspects of the disclosure.

FIG. 7 is another example screenshot illustrating another example use case 700 for a secondary distinction entity, in accordance with aspects of the disclosure.

For instance, in some implementations, the "per"-semantic may be used within a segmentation step 702 for creating a segment for customer satisfaction score. As shown in the example of FIG. 7, a comparison operator may be selected for the Bottom N/Bottom % of primary distinction entity PDO 710 per secondary distinction entity SDE 712 (e.g., sales representative) with the predetermined criteria 714 having, e.g., a value of 10%. In various instances, the example operation 702 may refer to selecting bottom 5 customers per sales representative (e.g., SDE 712) by customer satisfaction or select bottom 10% of customers per sales representative (e.g., SDE 712) by customer satisfaction. In the example of FIG. 7, the example operation 702 selects the bottom 10% of customers for every sales representative per SDE 712. In some examples, the value of the predetermined criteria 714 may be represented by (or based on) a selection of either percentage or count 720.

Figure 8:
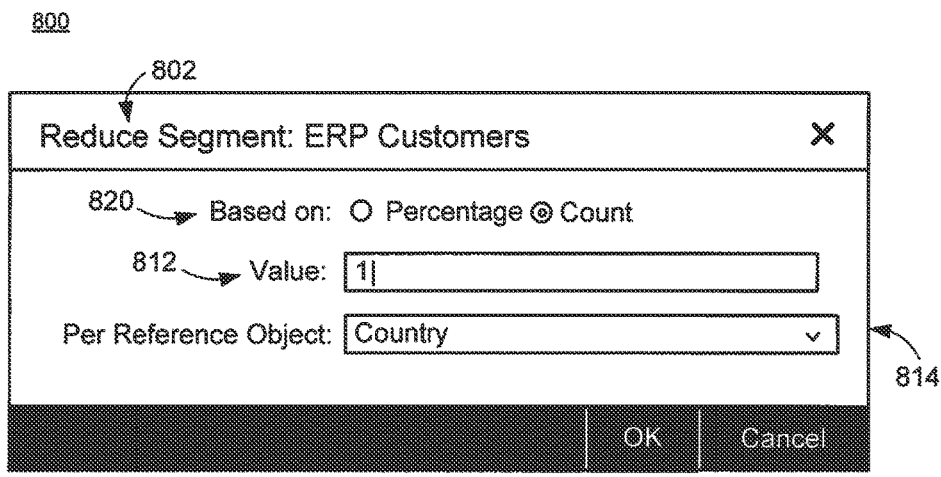
FIG. 8 is another example screenshot illustrating another example use case for a secondary distinction entity, in accordance with aspects of the disclosure.

FIG. 8 is another example screenshot illustrating another example use case 800 for a secondary distinction entity, in accordance with aspects of the disclosure.

For instance, in some implementations, the "per"-semantic may be used within a segmentation step 802 for creating a reduced segment for enterprise resource planning (ERP) customers. As shown in the example of FIG. 8, a comparison operator may be selected for the Random N/Random % of primary distinction entity PDO per secondary distinction entity SDE 812 (e.g., country) with the predetermined criteria 814 having, e.g., a value of 1. In various instances, the example operation 802 may refer to selecting any twenty customers per sales representative or select any 12% customers per sales representative. In the example of FIG. 8, the example operation 802 selects any 1 customer per country (e.g., SDE 812), where this example may be considered a type of deduplication to thereby, e.g., select only one customer per country. Further, the value of the predetermined criteria 814 may be represented by (or based on) a selection of either percentage or count 820.

Figure 9:
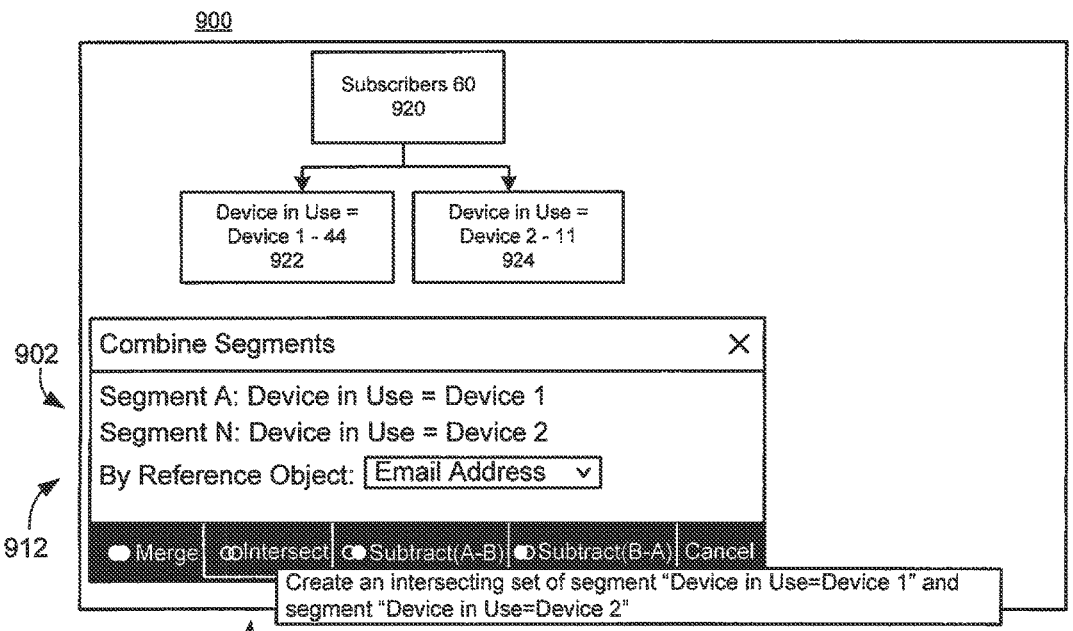
FIG. 9 is another example screenshot illustrating another example use case for a secondary distinction entity, in accordance with aspects of the disclosure.

FIG. 9 is another example screenshot illustrating another example use case 900 for a secondary distinction entity, in accordance with aspects of the disclosure.

As described in reference to the example of FIG. 9, the segmentation manager 120 may include the input handler 123 that may be configured to receive user input from a user via a graphical user interface (UI), such as, e.g., the UI 152. In the example of FIG. 9, user input for the example use case 900 may include selection of data and/or information related to an operation 902 of combining segments with one or more distinction entities, such as a first distinction entity (i.e., PDO) and a second distinction entity 912 (i.e., SDE) by, e.g., a reference object selection.

For instance, in some implementations, the "based-on"-semantic may be used within a set operation 902 for combining two segments (e.g., A, B) by way of an intersect operation 904 for an intersection of a primary distinction entity (e.g., customers) based on a secondary distinction entity 912 (e.g., email address). In this instance, the combine segment operation 902 may be used to intersect 904 one or more or all customers from segments A and B by (or based on) email-address (SDE 912) to identify customers with overlapping email-addresses.

In the example of FIG. 9, from a set of 60 subscribers and/or customers 920, 44 subscribers and/or customers are assigned to a first device in use 922, and 11 subscribers and/or customers are assigned to a second device in use 924. In this instance, the combine segment operation 902 is used to intersect 904 the subscribers and/or customers from segments A and B by (or based on) email-address (SDE 912) to identify customers with overlapping email-addresses. Further, in this example, a processing goal may be to create an intersecting set of multiple segments including a first segment A for a first device in use and second segment B for a second device in use based on an email address as selected by a reference object for the SDE 912.

In some implementations, other operations may be used including, e.g., reduce segment operations based on percentage or count using a selected SDE based on predetermined criteria. Further, in some other implementations, other reference objects may include other object selections including, for example, a sales organization or one or more sales representatives within one or more sales organizations.

Figure 10:
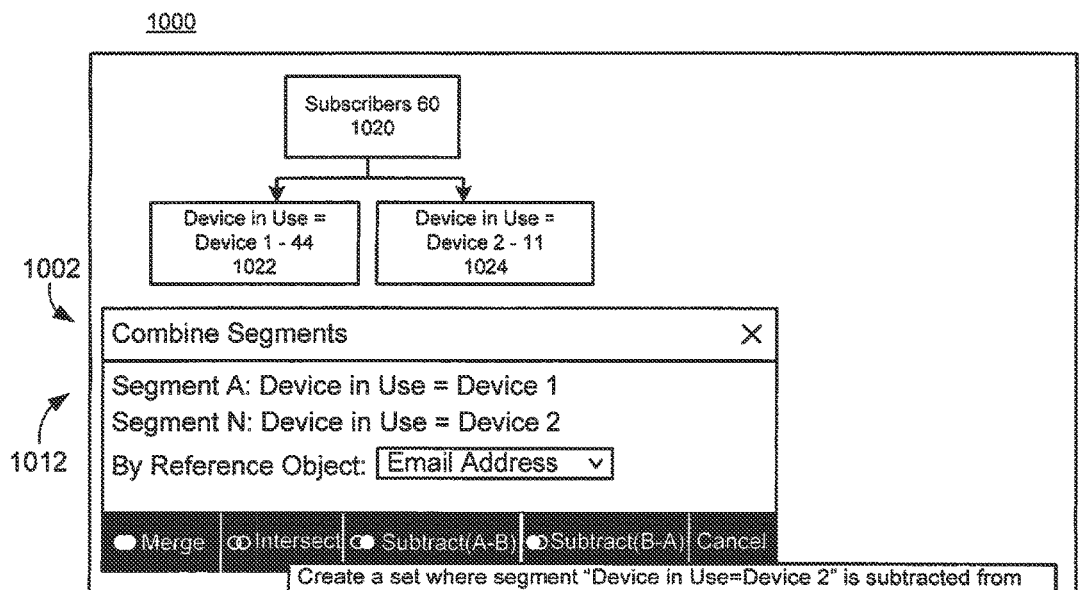
FIG. 10 is another example screenshot illustrating another example use case for a secondary distinction entity, in accordance with aspects of the disclosure.

FIG. 10 is another example screenshot illustrating another example use case 1000 for a secondary distinction entity, in accordance with aspects of the disclosure.

For instance, in some implementations, the "based-on"-semantic may be used within a set operation 1002 for subtracting two segments (e.g., A, B) by way of a subtract operation 1004 for a subtraction of a primary distinction entity (e.g., customers) based on a secondary distinction entity 1012 (e.g., email address). In this instance, the combine segment operation 1002 may be used to subtract 1004 one or more or all customers of segment A from segment B by (or based on) email-address (SDE 912) to identify customers with overlapping email-addresses, i.e., subtract all customers from segment A whose email-address appears as well for customers of segment B.

In the example of FIG. 10, from a set of 60 subscribers and/or customers 1020, 44 subscribers and/or customers are assigned to a first device in use 1022, and 11 subscribers and/or customers are assigned to a second device in use 1024. In this instance, the combine segment operation 1002 is used to subtract 1004 the subscribers and/or customers of segment A from segment B by (or based on) email-address (SDE 912) to identify customers with overlapping email-addresses. Further, in this example, a processing goal may be to create a set where a second segment B for a second device in use is subtracted from a first segment A for a first device in use based on an email address as selected by a reference object for the SDE 1012.

As shown in the examples of FIGS. 9-10, one or more combine segment operations may include merge, intersect, subtract (A-B), subtract (B-A), and cancel. In other examples, various other combine segment operations may be used.

Figure 11:
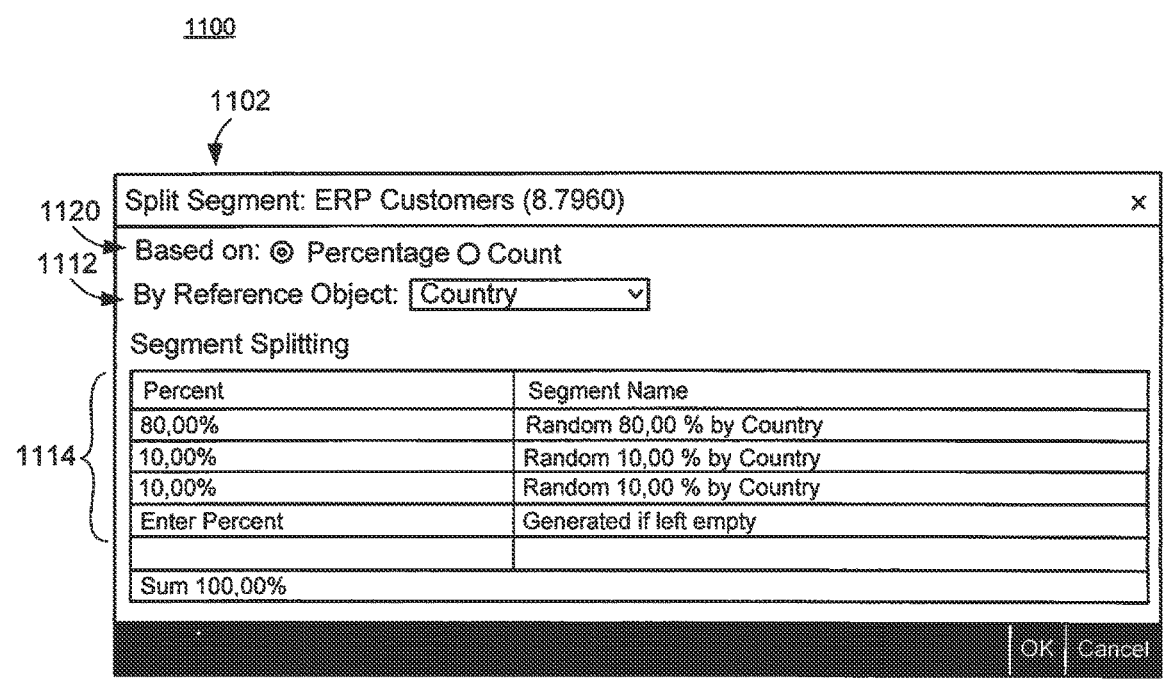
FIG. 11 is another example screenshot illustrating another example use case for a secondary distinction entity, in accordance with aspects of the disclosure.

FIG. 11 is another example screenshot illustrating another example use case 1100 for a secondary distinction entity, in accordance with aspects of the disclosure.

As described in reference to the example of FIG. 11, the segmentation manager 120 may include the input handler 123 that may be configured to receive user input from a user via a graphical user interface (UI), such as, e.g., the UI 152. In the example of FIG. 11, user input for the example use case 1100 may include selection of data and/or information related to an operation 1102 of splitting segments with use of one or more distinction entities, such as a first distinction entity (i.e., PDO) and a second distinction entity 1112 (i.e., SDE) by, e.g., a reference object selection.

For instance, in some implementations, the "based-on"-semantic may be used within a set operation 1102 for a random split segment operation by way of a split segment operation for a random split of a primary distinction entity (e.g., ERP customers) based on a secondary distinction entity 1112 (e.g., country). In this instance, the random split operation 1102 may be used to randomly split customers into multiple segments including at least three segments (e.g., 80%, 10%, 10%) 1114 by (or based on) country, e.g., a reference object selected for the SDE 1112 to thereby ensure that there is no country in two or three segments. Further, in some examples, the random split operation 1102 may be used to randomly split customers into multiple segments represented by (or based on) a selection of either percentage or count 1120.

In various implementations, aspects of the disclosure refer to use of a primary segmentation object (PSO). For instance, segmentation includes use of a PSO, which determines what to be counted and by which keys various data sources may be joined. In some instances, joining data sources based on the PSO may require PSO keys to be present in all data sources. As such, the PSO may be a true segmentation object and the instance, that its keys may be present in all data sources, may distinguish it from a distinction entity, and thus may be primary, secondary, or tertiary.

In various implementations, the PSO may be considered an Object Type known from customizing, and the segmentation object key may be considered a primary distinction entity. From another point of view, an object of interest for the segmentation profile may include, e.g., the customer, which may be the member desired to be counted, previewed, split, exported, etc. As such, in some examples, the values of the PSO may be treated as distinct when counting, previewing, etc.

In various implementations, aspects of the disclosure refer to use of a secondary distinction entity (SDE). For instance, some feature requests may demand that certain segmentation operations (e.g., which hitherto may be executed from a perspective of the PSO) may be executed from a shift in perspective, which may take distinct values of another, a secondary, entity into account. Hence, this description refers to a secondary distinction entity. In some examples, the SDE may define one or more attributes of a specific data source (e.g., country, region, etc.), which may alter certain segmentation operations. Further, in some examples, operations with distinct business semantics may be enriched with the SDE aspect, in a manner as described herein.

For example, a segmentation operation may include: Top N (SDE) per key figure (same applies to Top %, Bottom N and Bottom %).

Here, not the top N PSO values per (sorted) key figure values are taken, but for each distinct SDE value a sorted order of key figure values is computed, and then for each distinct SDE value the top N PSO values are persisted/selected/counted. So, the top N by SDE operation has the tendency to lead to a larger segment count than a Top N operation without SDE. In this example, what is counted is still the number of the persisted distinct PSO values. In some implementations, PSO values may be selected by key figure per each distinct SDE value.

In another example, a segmentation operation may include: single random KEEP (SDE). This case, works slightly different than the above GSPL/SDE and the non-SDE random keep, but similar to the Top N (SDE) case. It is not the random split group (SDE) case with just one segment.

Here, not the first random N PSO values per key figure values are taken, but for each distinct SDE value a random order of PSO values is computed, and then for each distinct SDE value the first N PSO values are persisted/selected/counted. So, the random N/N % by SDE operation has the tendency to lead to a larger segment count than just a random KEEP without SDE. What is counted is still the number of the persisted distinct PSO values. As all random operations, the Random KEEP (SDE) operation is independent of any attribute filter or criteria (be it a characteristic, or a key figure), since the sort order for selection is determined by a random figure, and an aggregated key figure value sorted ascending (Bottom N) or descending (Top N) is not needed. In some implementations, random PSO values may be selected per each distinct SDE value.

In another example, a segmentation operation may include: random split group (GSPL/SDE). Whereas the non-SDE random split group applies the randomizing function to each distinct PSO value, the SDE case here first determines all distinct values of the SDE, assigns them random values, then selects a certain number of these distinct SDE values based on their random number, and then ultimately re-determines all PSO values for these chosen distinct SDE values which also are part of the parent segment. So, there's something like an indirect, or referential randomization based not on the PSO values directly, but on the SDE values (and the parent segment, of course). In some implementations, PSO values may be selected based on randomly split SDE values.

In another example, a segmentation operation may include: set operations "Subtract by SDE" (DIF2) and "Intersect by SDE" (INT2). Additional set operations may be introduced which perform a two-level set operation each: "Difference by SDE" (DIF2) and "Intersect by SDE" (INT2). Here, the first level of the particular set operation is performed at the level of distinct SDE values: i.e., DIF2: "Subtracts" PSO values of one set A from those of another set B based on SDE values found in both sets. Only PSO values from set A will survive in the result set that do not have any SDE value also present in set B. The subtraction is primarily based on the SDE values and not directly on the PSO values themselves. That's the reason for putting the "subtract" above in parentheses. No PSO values from set B survive.

The second-level set operations may nevertheless be performed on PSO values as an EXCEPT. Given the restriction (by definition) that SDE values must have an 1:n cardinality regarding PSO values, to be meaningfully interpreted and technically implemented in a consistent way, given this restriction the second-level EXCEPT on PSO values does not make any difference in result set. I.e., it could be left out. The result set may be the same (with 1:n SDE values). It has been nevertheless included at the PSO level (first EXCEPT it he SQL below) to at least guarantee an EXCEPT operation for PSO values, if the cardinality of SDE: PSO values should be n:m for whatever reason.

In another example, a segmentation operation may include: INT2, which may be configured to combine PSO values of one set A with those of another set B based on the same SDE values found in both sets (=SDE-Intersect). In this example, a two-level set operation at the primary level of the SDE, its values found in set A are intersected with those SDE values of set B. The PSO values belonging to the result set of intersected SDE values may then be combined. This combination may be a UNION set operation at the secondary, PSO level.

From these implemented use cases, the relationship or cardinality between PSO and SDE values may ideally be a n:1 relationship. That is, a PSO value may refer to exactly one SDE value, but one SDE value may refer to multiple PSO values. With a n:m cardinality, the results of above SDE operations may be difficult to be interpreted in terms of business semantics, since it may not be guaranteed anymore that the SDE values of the individual child segments are disjunctive (i.e., mutually exclusive). However, with an n:1 cardinality, the implementation may guarantee that:

all distinct values of a SDE in any given group (child) segment;

all distinct values of a PSO in any given group (child) segment; and/or are not to be found in any of the neighboring group (child) segments.

In other words, in some examples, the segments of such a split group may be mutually exclusive in terms of both their PSO and SDE values.

In some implementations, aspects of the disclosure may refer to use of a secondary distinction entity (SDE) from a database and SQL-Generation aspect.

Secondary Distinction Entity from a UI Perspective: _sdeHandler.js

Since the metadata for the secondary distinction entity and the UI control is equal for all use cases of the secondary distinction entity (SDE), an own object may be implemented to handle the metadata and create the UI-control (a drop down listbox) for the SDEs. This javascript object may be built with the Singleton-Pattern, since all consumers of the SdeHandler share the same metadata and therefore share on instance of the object. The object has the following prototype-methods:

SdeHandler(aSdes, sSoDescription)—Constructor

Called from the metadata-receiver in the segmentation-controller to set the received secondary distinction entities from the customizing into the singleton-instance. Additionally, the description of the segmentation object (which is the primary distinction entity, and displayed in some cases) is added from the metadata into the singleton.

setInactive( )

Called from the metadata-receiver in the segmentation-controller in case no SDEs where received (and hence no Sdes are customized) which makes all controls which were or will be produced from the SdeHandler invisible getDropdown(sVisibleBindingPath, bInitialEntryWithSo)

Returns a new sap.ui.commons.DropdownBox instance with the dropdown-items bound according to the received SDEs (or the drop-down being invisible). If required an additional visibility-binding-path can be specified, which is evaluated in the control together with the received SDEs (required for Top/Bottom N/% use case to make the drop-down-box visible only if there are SDEs and if the select operator is Top/Bottom N/%). The second parameter bInitialEntryWithSo indicates whether the initial entry in the dropdown-box is "<None>" or is the name of the segmentation object.

The requester of the control has to ensure to (re)set the selected key of the drop-down-box (optimally via binding) whenever required (reset in case of create, set in case of edit) and to read the selected SdeId from the drop-down-box when creating and/or changing a segment.

getLabel(sI18nText, sLabelForId, sVisibleBindingPath)

Returns a new sap.ui.commons.Label instance with the Label-Text being taken from the i18n-repository (for translation) and the label for-property set to the specified id. If required an additional visibility-binding-path can be specified, which is evaluated in the control together with the received SDEs (required for Top/Bottom N/% use case to make the label visible only if there are SDEs and if the select operator is Top/Bottom N/%).

getHorizontalLayout(oLabel, oDropDown)

Returns a new Layout containing the two provided controls. The visibility is controlled depending on the existence of SDEs.

getSdeText(sSdeId)

Returns the language dependent text for the Sde-Id provided. Required for segment name generation and segment summary getVisibleBinding(sVisibleBindingPath)

Internal helper function which creates the binding object used for label, dropdown and layout depending on the SDE-existence and optional sVisibleBindingPath In some implementations, aspects of the disclosure may refer to use of a secondary distinction entity from a communication aspect.

The communication details between ABAP backend and HTML5 frontend are documented within the following wiki:

Relevant for SDEs may include the following Pseudo Code I:

Operation "GetStartupData"—response contains now an array like for example:

```
secondaryDistinctionEntities: [
  {id: "ACCOUNT", text: "Account"},
   id: "CONTACT_PERSON", text: "Contact Person"}]
```

All operations sending segment-data to the backend have an adjusted segment structure as follows:

```
{id: "ab", ...
 data: {
   mode: "intr", ...
   secDistinctionId: "ACCOUNT"//optional
 }
}
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any type of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
    a segmentation manager configured to cause the at least one processor to generate a reduced segment of a population set for a course of activities based on one or more distinction entities, the segmentation manager including:
    a set handler configured to determine the population set for the course of activities, the population set including a first number of members identified by a first distinction entity of the one or more distinction entities;
    an entity handler configured to select a second distinction entity of the one or more distinction entities related to the first number of members of the population set; and
    a segmentation engine configured to generate the reduced segment of the population set for the course of activities by selecting a second number of members from the first number of members of the population set identified by the second distinction entity based on predetermined criteria and removing unselected members of the first number of members of the population set from the population set.

2. The system of claim 1, wherein the entity handler is configured to select the first distinction entity for the course of activities.

3. The system of claim 1, wherein the set handler is configured to select the first number of members of the population set.

4. The system of claim 1, wherein the set handler includes an input handler configured to receive user input from a user via a graphical user interface, the user input including information related to each of the first distinction entity, the second distinction entity, and the predetermined criteria.

5. The system of claim 1, wherein the set handler includes an output handler configured to display user output to a user via a graphical user interface, the user output including information related to the first number of members of the population set and the second number of members of the reduced segment of the population set.

6. The system of claim 1, wherein:
    the population set relates to a set of customers, and
    the first distinction entity relates to customers targeted by the course of activities.

7. The system of claim 1, wherein:
    the course of activities relates to a business campaign including an ordered set of business related activities, and
    the second distinction entity relates to sales representatives assigned to the first distinction entity.

8. The system of claim 1, wherein the second number of members relates to a capacity including a predetermined capacity value related to the second distinction entity.

9. The system of claim 1, wherein the predetermined criteria relates to at least one business related measurement value including a predetermined sales volume related to the first distinction entity.

10. The system of claim 1, wherein the predetermined criteria restricts the reduced segment of the population set to a predetermined sales volume related to the first distinction entity.

11. The system of claim 1, wherein the second number of members of the population set is at least less than the first number of members of the population set.

12. A computer program product, the computer program product tangibly embodied on a non-transitory computer-readable storage medium and including instructions that, when executed by at least one processor:
    generate a reduced segment of a population set for a course of activities based on one or more distinction entities;
    determine a population set for a course of activities, the population set including a first number of members identified by a first distinction entity of the one or more distinction entities;
    select a second distinction entity of the one or more distinction entities related to the first number of members of the population set; and
    generate a reduced segment of the population set for the course of activities by selecting a second number of members from the first number of members of the population set identified by the second distinction entity based on predetermined criteria and removing unselected members of the first number of members of the population set from the population set.

13. The computer program product of claim 12, including instructions that, when executed by the at least one processor, are configured to:
    receive user input from a user via a graphical user interface, the user input including information related to each of the first distinction entity, the second distinction entity, and the predetermined criteria; and
    display user output to a user via a graphical user interface, the user output including information related to the first number of members of the population set and the second number of members of the reduced segment of the population set.

14. The computer program product of claim 12, wherein:
    the population set relates to a set of customers,
    the first distinction entity relates to customers targeted by the course of activities,
    the course of activities relates to a business campaign including an ordered set of business related activities, and
    the second distinction entity relates to sales representatives assigned to the first distinction entity.

15. A computer program product, the computer program product tangibly embodied on a non-transitory computer-readable storage medium and including instructions that, when executed by at least one processor, are configured to:
    determine a population set for a campaign identified by a first distinction entity, the campaign including a first campaign and a second campaign, the population set including a first customer segment with a first number of members for the first campaign, the population set including a second customer segment with a second number of members for the second campaign;
    select a second distinction entity related to the first number of members of the population set and a second distinction entity related to the second number of members of the population set; and generate a reduced segment of the first segment of the population set for the first campaign by removing one or more members of the first number of members of the population set, if after comparing, the second distinction entity related to the first number of members of the population set matches the second distinction entity related to the second number of members of the population set.

16. The computer program product of claim 15, wherein the first distinction entity relates to customers, and the second distinction entity relates to email addresses.

17. The computer program product of claim 15, further comprising instructions that, when executed by at least one processor, are configured to:

select the second number of members from the first number of members of the population set identified by the second distinction entity based on predetermined criteria.

18. The computer program product of claim 15, further comprising instructions that, when executed by at least one processor, are configured to:

compare the second distinction entity of the first number of members of the population set to the second distinction entity of the second number of members of the population set.

19. A computer program product, the computer program product tangibly embodied on a non-transitory computer-readable storage medium and including instructions that, when executed by at least one processor, are configured to:

determine a population set for a campaign identified by a first distinction entity, the campaign including a first campaign having a first course of activities and a second campaign having a second course of activities, the population set including a first customer segment with a first number of members for the first campaign, the population set including a second customer segment with a second number of members for the second campaign;

select a second distinction entity related to the first number of members of the population set and a second distinction entity related to the second number of members of the population set; and generate a combined segment of the first segment of the population set for the first course of activities and of the second segment of the population set for the second course of activities by retaining one or more members of the first number of members of the population set and one or more members of the second number of members of the population set, if after comparing, the second distinction entity related to the first number of members of the population set matches the second distinction entity related to the second number of members of the population set.

* * * * *